United States Patent
Randal

(10) Patent No.: US 10,131,552 B2
(45) Date of Patent: Nov. 20, 2018

(54) ION EXCHANGE SYSTEM FOR REMOVING SULFATE IONS FROM WATER

(71) Applicant: Amperage Energy Inc., Cochrane (CA)

(72) Inventor: Chad Allen Randal, Cochrane (CA)

(73) Assignee: Amperage Energy Inc., Cochrane, AB (CA)

( * ) Notice: Subject to any disclaimer, the term of this patent is extended or adjusted under 35 U.S.C. 154(b) by 227 days.

(21) Appl. No.: 14/590,616

(22) Filed: Jan. 6, 2015

(65) Prior Publication Data
US 2016/0194221 A1 Jul. 7, 2016

(51) Int. Cl.
*C02F 1/42* (2006.01)
*C02F 9/00* (2006.01)
(Continued)

(52) U.S. Cl.
CPC .............. *C02F 1/42* (2013.01); *B01J 49/07* (2017.01); *C02F 9/00* (2013.01); *B01J 47/012* (2017.01); *B01J 47/022* (2013.01); *C02F 2001/422* (2013.01); *C02F 2101/006* (2013.01); *C02F 2101/101* (2013.01); *C02F 2103/10* (2013.01);
(Continued)

(58) Field of Classification Search
CPC .............. C02F 2001/422; C02F 9/005; C02F 2101/101; C02F 2201/008; C02F 1/42; C02F 9/00; C02F 2101/006; C02F 2303/16; B01J 47/002; B01J 47/022; B01J 49/0013; B01J 49/02; B01J 47/012; B01J 49/07
See application file for complete search history.

(56) References Cited

U.S. PATENT DOCUMENTS 2,192,451 A * 3/1940 Moore .................... C02F 9/005
 210/190
2,698,292 A * 12/1954 Mueller .................... C02F 1/42
 210/103
(Continued)

FOREIGN PATENT DOCUMENTS

WO WO 2000/000273 1/2000
WO WO 2009/131635 10/2009

OTHER PUBLICATIONS

DOWEX Ion Exchange Resin-Uniform Particle Size Resins for Demineralization, Jun. 2011, Dow Chemical Company, retrieved from the internet. Retrieved on Jun. 28, 2017, <URL: http://www.lenntech.com/Data-sheets/Dowex-Ion-Exchange-resins-Uniform-Particle-Size-Resins-for-Demineralisation.pdf>, one page.*

(Continued)

*Primary Examiner* — Matthew O Savage
(74) *Attorney, Agent, or Firm* — Cesari and McKenna, LLP

(57) ABSTRACT

Mobile treatment systems and methods for use in removing sulfates from contaminated water using a pre-treatment subsystem configured to remove particulates and debris from the contaminated water and to produce pre-treated water; a treatment subsystem configured to remove sulfates from the pre-treated water and to produce treated water, the treatment subsystem including at least one treatment tank with a collection unit having one or more filters with pore or inlet sizes of approximately 0.35-1.2 mm; and at least one storage tank configured to collect the treated water. Optionally, the systems and methods may use a backwash subsystem configured to backwash the treatment subsystem.

9 Claims, 6 Drawing Sheets

(51) Int. Cl.
  *B01J 49/07*    (2017.01)
  *C02F 101/10*   (2006.01)
  *B01J 47/022*   (2017.01)
  *B01J 47/012*   (2017.01)
  *C02F 101/00*   (2006.01)
  *C02F 103/10*   (2006.01)
  *C02F 103/36*   (2006.01)

(52) U.S. Cl.
  CPC .. *C02F 2103/365* (2013.01); *C02F 2201/008* (2013.01); *C02F 2303/16* (2013.01); *C02F 2303/24* (2013.01)

(56) References Cited

U.S. PATENT DOCUMENTS

| | | | |
|---|---|---|---|
| 3,272,340 A * | 9/1966 | Hungerford, Jr. | B01D 24/12 210/172.2 |
| 3,842,002 A | 10/1974 | Boari | |
| 4,049,548 A | 10/1977 | Dickerson | |
| 4,366,063 A | 12/1982 | O'Connor | |
| 4,379,750 A * | 4/1983 | Tiggelbeck | B01D 15/00 210/232 |
| 4,383,920 A * | 5/1983 | Muller | B01D 15/00 210/241 |
| 4,496,464 A * | 1/1985 | Hensley | B01D 24/105 210/269 |
| 4,536,287 A * | 8/1985 | Himsley | B01D 23/20 210/293 |
| 4,659,460 A | 4/1987 | Muller et al. | |
| 5,035,807 A | 7/1991 | Maree | |
| 5,059,317 A * | 10/1991 | Marius | B01D 61/04 210/202 |
| 5,071,563 A | 12/1991 | Shiga et al. | |
| 5,346,620 A | 9/1994 | Hendrix et al. | |
| 5,441,646 A | 8/1995 | Heller et al. | |
| 5,593,593 A | 1/1997 | Nilsen et al. | |
| 6,464,884 B1 * | 10/2002 | Gadgil | C02F 9/005 210/241 |
| 2004/0251207 A1 * | 12/2004 | Carlberg | B01J 39/043 210/670 |
| 2006/0157415 A1 * | 7/2006 | Koefod | B01J 49/60 210/670 |
| 2008/0021124 A1 * | 1/2008 | Vero | B01J 49/0004 521/26 |
| 2010/0288308 A1 * | 11/2010 | Fukui | B01J 41/04 134/18 |
| 2010/0307972 A1 | 12/2010 | Bratty et al. | |
| 2012/0205313 A1 | 8/2012 | Sathrugnan et al. | |
| 2013/0126431 A1 * | 5/2013 | Henson | C02F 9/00 210/638 |

OTHER PUBLICATIONS

Wayback Machine, retrieved from the internet. Retrieved on Jun. 28, 2017, <URL: http://web.archive.org/web/*/http://www.lenntech.com/Data-sheets/Dowex-Ion-Exchange-resins-Uniform-Particle-Size-Resins-for-Demineralisation.pdf>, three pages.*

Rice et al, Suspended Solids Removal for Countercurrent Ion Exchange Systems, Jul. 2002, International Water, 8 pages.*

* cited by examiner

ION EXCHANGE SYSTEM FOR REMOVING SULFATE IONS FROM WATER

BACKGROUND

Technical Field

This application relates generally to systems and methods used to treat water and, more particularly, to systems and methods used to remove sulfates from water.

Background Information

Many industrial processes produce water contaminated with sulfates, which are toxic to humans and animals. For example, sulfates in drinking water may cause diarrhea and nausea. High sulfate levels in water may have other deleterious effects including causing scale buildup in water pipes and reducing the cleaning power of detergents. Increased levels of sulfates may also stimulate the growth of naturally occurring sulfate reducing bacteria, which convert sulfates to sulfides and neurotoxic methyl mercury.

Accordingly, there is a significant need in the industry for systems and methods to remove sulfates from water that are economical, mobile, easily transported to and from various sites and readily assembled on-site with easy operability and which are also effective at removing large-scale quantities of sulfates with high throughput.

SUMMARY

Mobile systems and methods of operating the systems for removing sulfates from water employ a pre-treatment subsystem and a treatment subsystem interconnected by a plurality of piping and valve subsystems. Water contaminated with sulfates is pumped from a site to the pre-treatment subsystem where the contaminated water is filtered. This pre-treated water is then treated in the treatment subsystem by removing sulfates through ion exchange and filtering treated water through filters with pore or inlet sizes of approximately 0.35-1.2 mm. After pre-treatment and treatment of the contaminated water, a backwash subsystem may be employed to backwash the treatment subsystem to remove collected sulfates from the treatment subsystem.

The subsystems of the systems and methods are contained together on a single, portable trailer bed or mobile unit. The systems and methods of operating the systems are economical, easily transported to and from various sites and readily assembled on-site with easy operability, and are effective at removing large-scale quantities of sulfates with high throughput.

BRIEF DESCRIPTION OF THE DRAWINGS

The embodiments described below refer to the accompanying drawings, of which.

DETAILED DESCRIPTION OF AN ILLUSTRATIVE EMBODIMENT

Mobile systems and methods of operating the systems for removing sulfates from water are discussed in more detail below. The subsystems of the systems and methods fit together on a single trailer bed or mobile unit and provide an economical, complete and mobile treatment system that is easy to transport, easy to set-up, easy to operate and is highly effective at removing large amounts of sulfates with high throughput. The mobile systems and methods also treat various types of water contaminated with sulfates including, but not limited to, fresh water, salt water, produced water, fracturing flowback water and acid mine drainage. Treatment sites include, but are not limited to, plants, refineries, trucks, pipelines, fracturing sites, mines, wells or the like. For purposes of describing the embodiments herein, the contaminated water is fresh water from a well.

Figure 1:
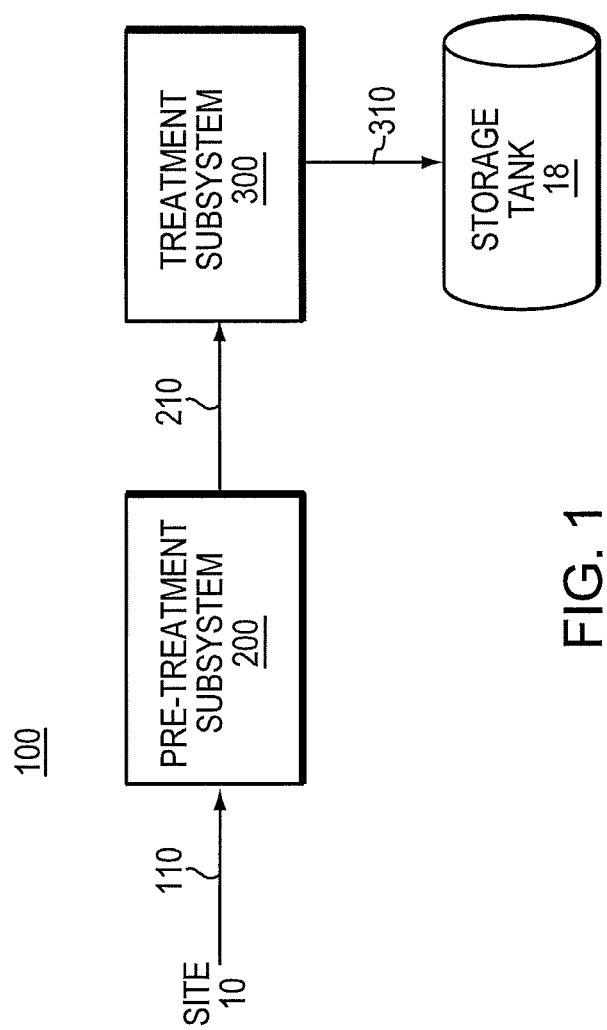
FIG. 1 is an overview of the systems and methods.

Referring to FIG. 1, a system 100 for removing sulfates from contaminated water is established proximate to a site 10. The system 100 includes a pre-treatment subsystem 200, a treatment subsystem 300 and a storage tank 18 interconnected by a plurality of piping and valve subsystems (shown in FIG. 4). Contaminated water 110 is pumped from the site 10 to the pre-treatment subsystem 200 where the contaminated water 110 is pre-treated by filtering out particulates and debris to yield pre-treated water 210. The pre-treated water 210 is then pumped from the pre-treatment subsystem 200 to the treatment subsystem 300 where the pre-treated water 210 is treated to remove sulfates. The treated water 310 is then pumped to the storage tank 18. The flow rate of the system 100 is about 1900 L/min.

Figure 2:
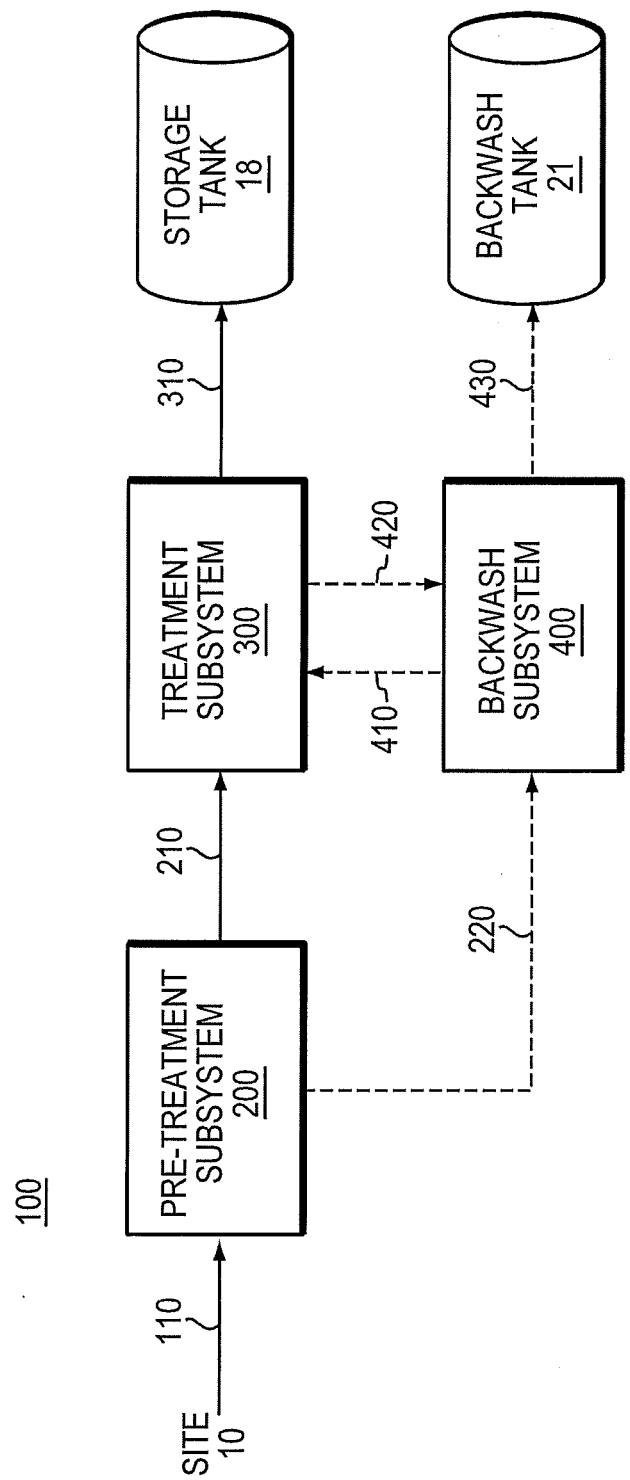
FIG. 2 is an overview of the systems and methods including a backwash subsystem.
Figure 4:
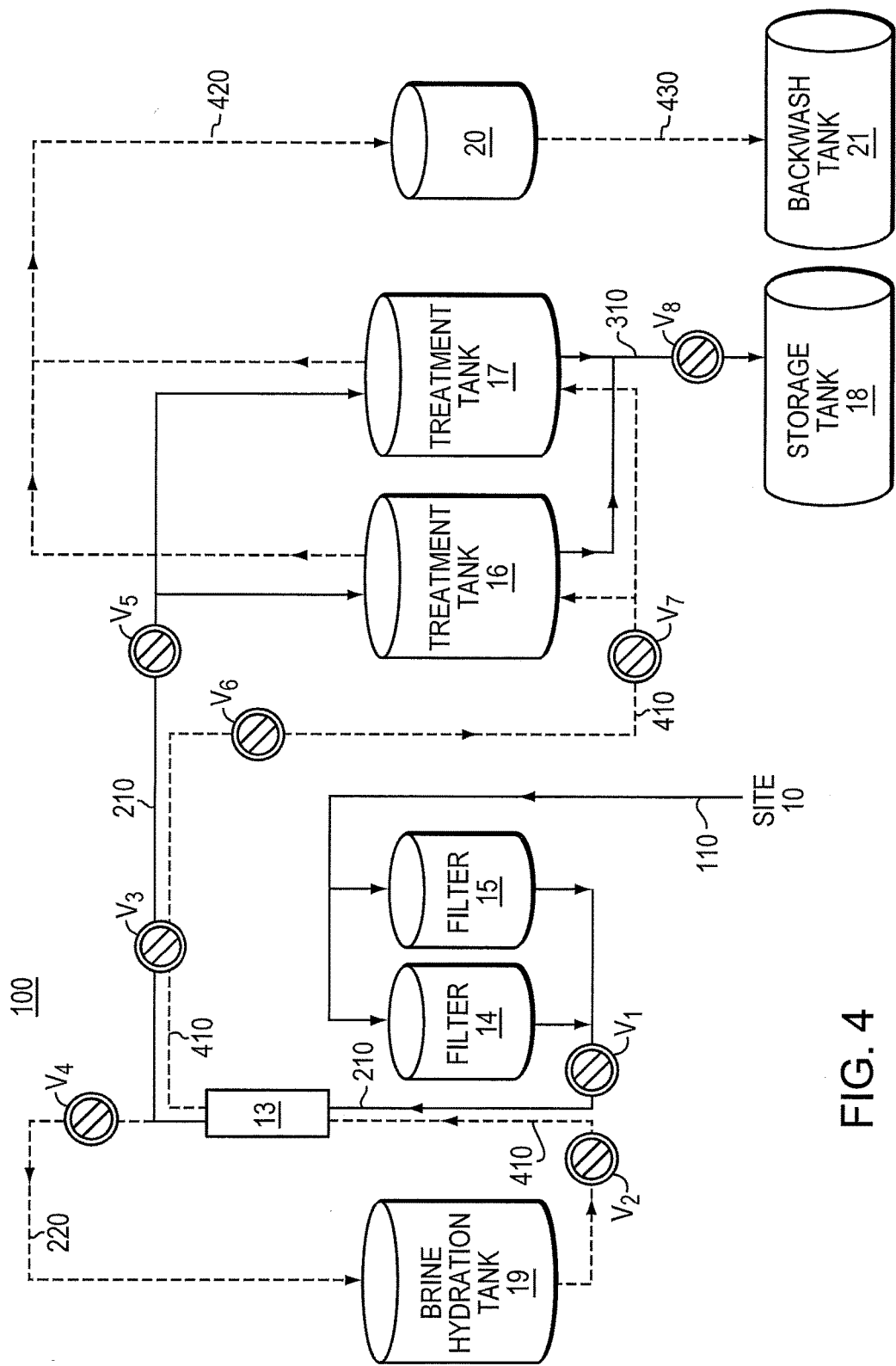
FIG. 4 is a functional diagram of the pre-treatment subsystem, the treatment subsystem and the backwash subsystem of an illustrative embodiment.

Referring now to FIG. 2, the system 100 includes the pre-treatment subsystem 200, the treatment subsystem 300, a backwash subsystem 400, the storage tank 18 and an backwash tank 21 interconnected by a plurality of piping and valve subsystems (shown in FIG. 4). Contaminated water 110 is pumped from the site 10 to the pre-treatment subsystem 200 where the contaminated water 110 is pre-treated by filtering out particulates and debris to yield pre-treated water 210. The pre-treated water 210 is pumped from the pre-treatment subsystem 200 to the treatment subsystem 300 where the pre-treated water 210 is treated by ion exchange chromatography to remove sulfates. The treated water 310 is then pumped to the storage tank 18 at a rate of about 1900 L/min.

Figure 5:
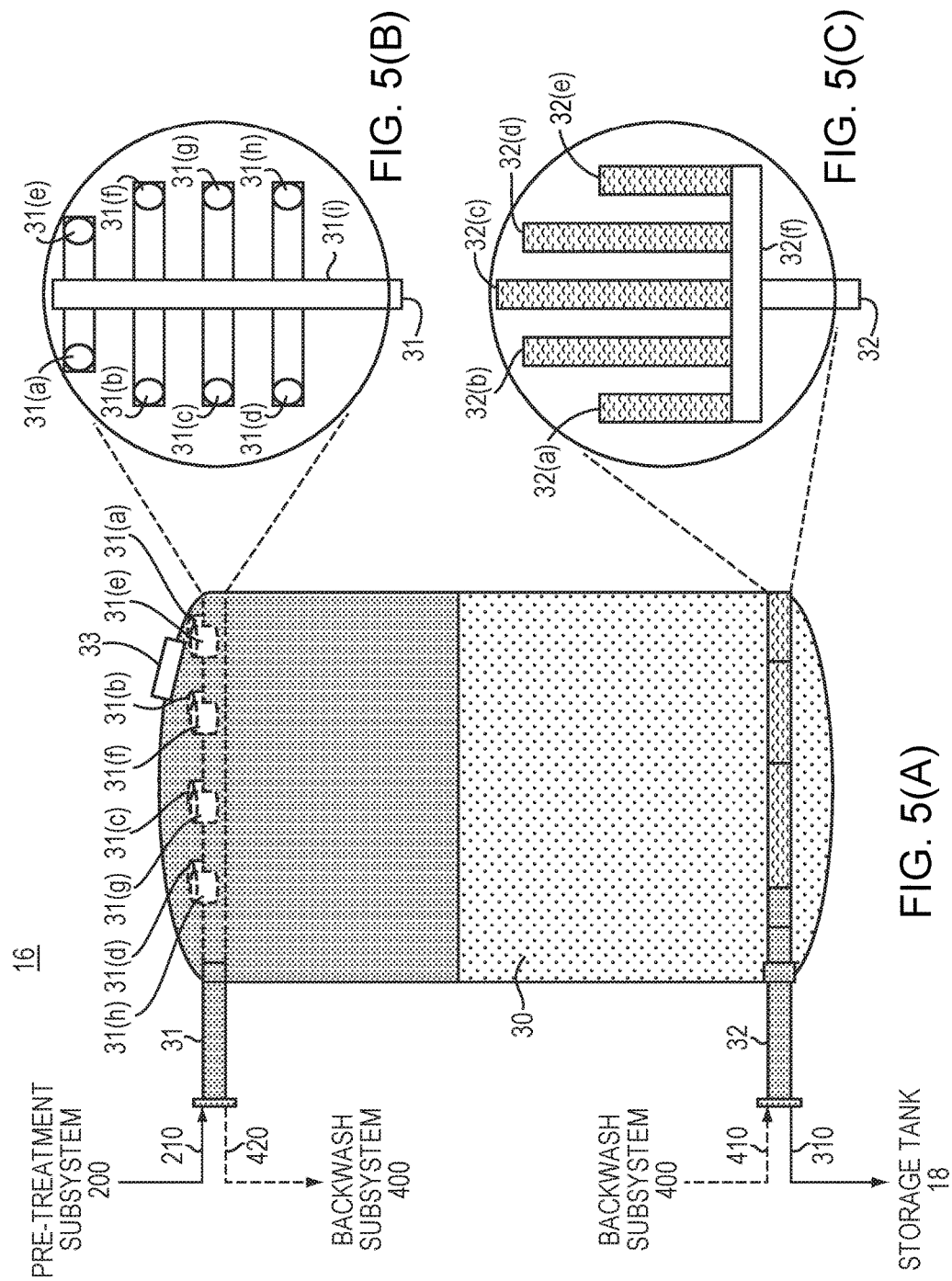
FIGS. 5(A)-5(C) are functional diagrams of a treatment tank of the treatment subsystem of an illustrative embodiment, including cross-sectional views of the treatment tank.

After pre-treatment and treatment of the contaminated water 110, the treatment subsystem 300 is backwashed to, among other things, cleanse and regenerate the ion exchange media (shown in FIG. 5(A)) of the treatment subsystem 300. During backwashing, the flow of pre-treated water 210 to the treatment subsystem 300 is stopped by operation of a valve unit (shown in FIG. 4). The contaminated water 110 is then pre-treated by the pre-treatment subsystem 200 and a pre-treated water 220 is then pumped to the backwash subsystem 400 where it is mixed with a pre-determined amount of sodium chloride to yield a brine solution 410. The amount of sodium chloride may vary depending on the desired concentration of brine solution. The brine solution 410 is pumped from the backwash subsystem 400 to the treatment subsystem 300 and flushed through the treatment subsystem 300 to remove any sulfates collected by the treatment subsystem 300 during the treatment of the pre-treated water 210. A resulting backwash solution 420 is then pumped back to the backwash subsystem 400 where any ion exchange media present in the backwash solution 420 is removed. A solution 430 is then pumped to a backwash tank 21.

Figure 3:
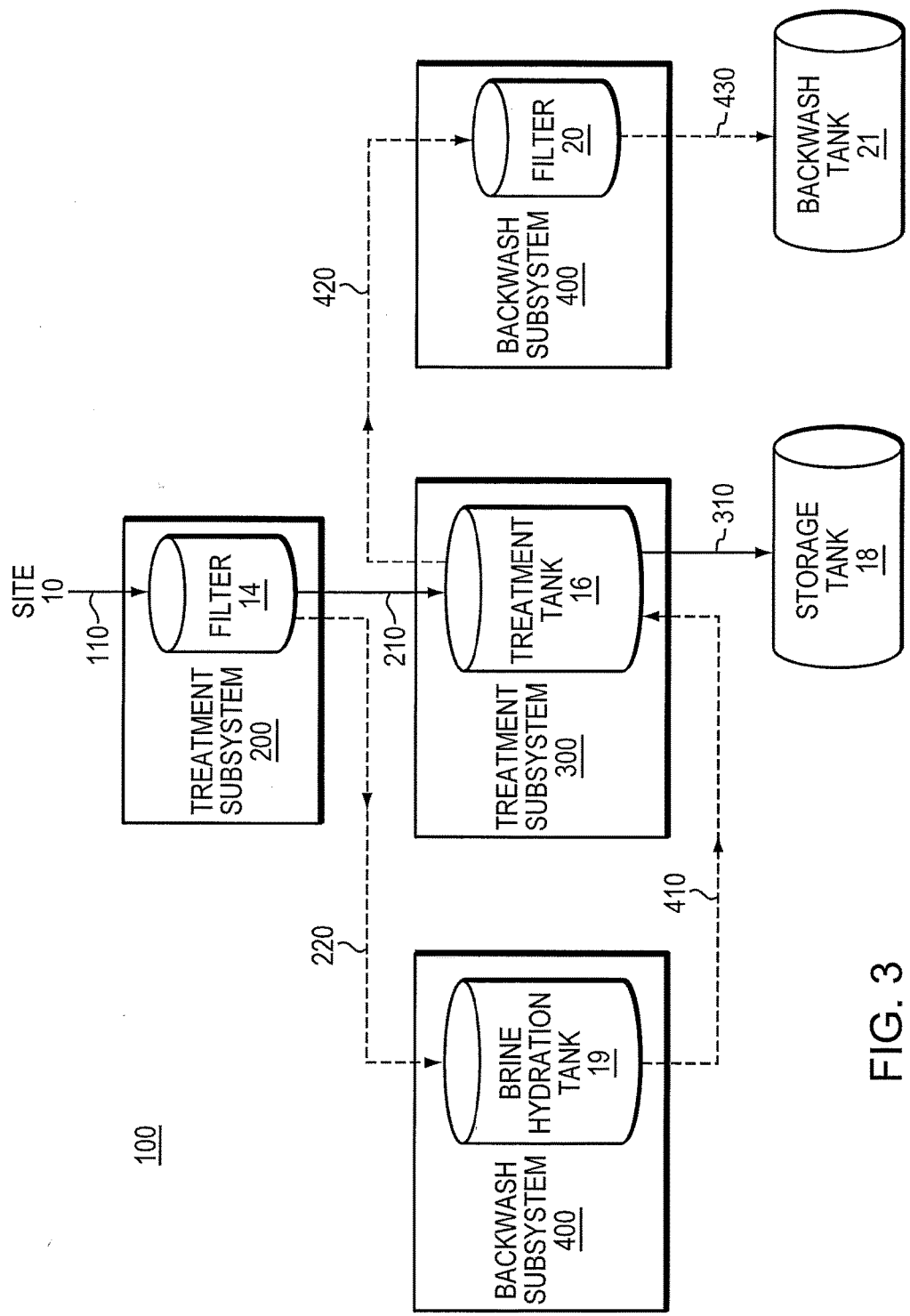
FIG. 3 is a functional diagram of a pre-treatment subsystem, a treatment subsystem and the backwash subsystem of an illustrative embodiment.

Referring now to FIG. 3, the pre-treatment subsystem 200 includes a filter 14. The contaminated water 110 is pumped from the site 10 to the filter 14 where particulates and debris are removed from the contaminated water 110. The pre-treated water 210 is then pumped to the treatment subsystem 300 where the pre-treated water 210 is treated in a treatment tank 16 by removing sulfates. The treatment tank 16 has a volume of about 5.6 m$^3$. After the pre-treated water 210 enters the treatment tank 16, it flows through a sulfate-specific ion exchange media (shown in FIG. 5(A)), which removes sulfates from the pre-treated water 210. By removing sulfates, the sulfate-specific ion exchange media also removes naturally occurring radioactive materials ("NORMs") from the pre-treated water 210. The treated water 310 is then pumped out of the bottom of the treatment tank 16 to the storage tank 18. The contaminated water 110 is pre-treated and treated by the system 100 at a flow rate of about 1900 L/min.

After pre-treatment and treatment of the contaminated water 110, the treatment subsystem 300 is backwashed. The flow of the pre-treated water 210 to the treatment subsystem 300 is stopped and the pre-treated water 220 is pumped to the backwash subsystem 400. The pre-treated water 220 is pumped into a brine hydration tank 19 and mixed with a pre-determined amount of sodium chloride to yield the brine solution 410. The brine solution 410 is then pumped to the treatment subsystem 300 to backwash the treatment tank 16 by pumping the brine solution 410 into the bottom of the treatment tank 16, through the ion exchange media (shown in FIG. 5(A)) and out the top of the treatment tank 16. As the brine solution 410 flows through the treatment tank 16, any collected sulfates and NORMs are removed from the sulfate-specific ion exchange media (shown in FIG. 5(A)) by the brine solution 410. The resulting backwash solution 420 is then pumped out of the top of the treatment tank 16 to a filter 20 of the backwash subsystem 400. The filter 20 filters out of the backwash solution 420 any ion exchange media that may have been removed from the treatment tank 16 during backwashing. The resulting solution 430 is pumped to the backwash tank 21.

Referring now to FIG. 4, the contaminated water 110 is pumped from the site 10 simultaneously to a first filter, the filter 14, and a second filter 15 of the pre-treatment subsystem 200. The first filter 14 and the second filter 15 pre-treat the contaminated water 110 by filtering out particulate matter and debris, including organic and inorganic matter. The pre-treated water 210 is then pumped through an open valve $V_1$, a heat exchanger 13, an open valve $V_3$, and an open valve $V_5$ to a first treatment tank, the treatment tank 16, and a second treatment tank 17 of the treatment subsystem 300. A valve $V_2$, a valve $V_4$ and a valve $V_6$ remain closed. The first treatment tank 16 and the second treatment tank 17 have volumes of about 5.6 m$^3$. The heat exchanger 13 heats the pre-treated water 210 as it is pumped to the treatment subsystem 300. Operation of the heat exchanger 13 is optional and will depend on the preferences of the user in conjunction with various factors, including, but not limited to, the atmospheric temperature and the temperature of the contaminated water 110.

The pretreated water 210 is then treated simultaneously in the first treatment tank 16 and the second treatment tank 17 by passing the pre-treated water 210 through a sulfate-specific ion exchange media (shown in FIG. 5(A)) to remove sulfates and any NORMs. A valve $V_7$ remains closed and the treated water 310 is pumped from the bottoms of the first treatment tank 16 and the second treatment tank 17 to the storage tank 18 through an open valve $V_8$. The contaminated water 110 is pre-treated and treated by the system 100 at a flow rate of about 1900 L/min.

After pre-treatment and treatment of the contaminated water 110, the system 100 is backwashed to refresh and recycle the ion exchange media in the first treatment tank 16 and the second treatment tank 17. The contaminated water 110 is pre-treated in the pre-treatment subsystem 200 by filtering the contaminated water 110 through the first filter 14 and the second filter 15. The valves $V_1$ and $V_4$ are opened and the valves $V_2$ and $V_3$ are closed. The pre-treated water 220 is pumped to the brine hydration tank 19 through the heat exchanger 13, which may heat the pre-treated water 220 to a desired temperature.

The pre-treated water 220 is mixed with a pre-determined amount of sodium chloride in the brine hydration tank 19 to yield, for example, a 10% NaCl brine solution. After sufficient mixing, the valves $V_1$, $V_4$, $V_5$ and $V_8$ are closed and the valves $V_2$, $V_3$, $V_6$ and $V_7$ are opened. The brine solution 410 is then pumped to the first treatment tank 16 and the second treatment tank 17. In this embodiment, the brine solution 410 is pumped through a portion of the same piping that the pre-treated water 210 was pumped through during treatment, such as the piping between valves $V_1$ and $V_2$ and the heat exchanger 13 and the piping between the heat exchanger 13 and valves $V_5$ and $V_6$.

The brine solution 410 is simultaneously pumped into the bottom of the first treatment tank 16 and the second treatment tank 17 and through the sulfate-specific ion exchange media (shown in FIG. 5(A)). As the brine solution 410 flows through the sulfate-specific ion exchange media (shown in FIG. 5(A)), sulfates and NORMs are removed from the sulfate-specific ion exchange media and collected in the brine solution as the backwash solution 420. The backwash solution 420 is then pumped out the tops of the first treatment tank 16 and the second treatment tank 17 to the filter 20. Any ion exchange media collected in the backwash solution 420 is filtered out of the backwash solution 420 by the filter 20. The resulting solution 430 is then pumped to the backwash tank 21. Alternatively, the solution 430 may be pumped back to the brine hydration tank 19 and used for additional backwashing of the treatment subsystem 300. Additional backwash filters may also be used as needed.

FIGS. 5(A), 5(B) and 5(C) show the treatment tank 16 in more detail. Referring to FIG. 5(A), the treatment tank 16 is about halfway filled with a sulfate-specific ion exchange media 30. The treatment tank 16 includes a dispersion unit 31 located at the top of the treatment tank 16 and a collection unit 32 located at the bottom of the treatment tank 16. The dispersion unit 31 is interconnected to the pre-treatment subsystem 200 and the backwash subsystem 400. The collection unit 32 is interconnected to the storage tank 18 and the backwash subsystem 400. The treatment tank 16 may also include a sealed and hinged opening 33, which may be a transparent window that allows an operator to view the interior of the treatment tank 16.

FIG. 5(B) is a cross-sectional view of the treatment tank 16 as it appears from inside the treatment tank 16 looking down on the dispersion unit 31 from the top of the treatment tank 16. The dispersion unit 31 includes a central structure 31($i$) extending horizontally across the diameter and the top of the treatment tank 16. The dispersion unit 31 includes eight arms 31($a$)-($h$) that branch off perpendicularly from the central structure 31($i$), extending horizontally towards the sides of the treatment tank 16. In this embodiment, the central structure 31(*i*) and arms 31(*a*)-(*h*) are tube-like in geometry. The terminal ends of arms 31(*a*)-(*h*) curve upward towards the top of the treatment tank 16 and are open to the inside of the treatment tank 16, which ensures that water flows out of each one of the arms at about equal volumes, rates and pressures. In other embodiments, the ends of arms 31(*a*)-(*h*) may be covered with a filter-like material, such as stainless steel mesh, in order to, for example, prevent the ion exchange media from entering the dispersion unit 31 during backwashing.

FIG. 5(C) is a cross-sectional view of the treatment tank 16 as it appears from inside the treatment tank 16 looking down on the collection unit 32 from a point just below the dispersion unit 31. The collection unit 32 includes a base 32(*f*) with five filter extensions 32(*a*)-(*e*) that extend horizontally outwards from the base 32(*f*) across the diameter of the lower portion of the treatment tank 16. In this embodiment, the base 32(*f*) and the five filter extensions 32(*a*)-(*e*) are tube-like in geometry. The five filter extensions 32(*a*)-(*e*) are filters with pore or inlet sizes of approximately 0.35-1.2 mm, preferably about 0.56 mm. In this embodiment, the collection unit 32 does not rest or touch the floor of the treatment tank 16 and there is a small amount of space between the floor of the treatment tank 16 and the collection unit 32. As shown in FIG. 5(A), this small amount of space is filled with the ion exchange media 30.

During treatment, the pre-treated water 210 is pumped into the treatment tank 16 through the dispersion unit 31. The pre-treated water 210 flows through the central structure 31(*i*) and out of arms 31(*a*)-(*h*) into the treatment tank 16 and down onto the ion exchange media 30. The pre-treated water 210 then flows through the ion exchange media 30, which treats the pre-treated water 210 by collecting and removing sulfate ions and NORMs from the pre-treated water 210. After treatment, the treated water 310 flows into the five filter extensions 32(*a*)-(*e*) and the base 32(*f*) of the collection unit 32. The ion exchange media 30 remains in the treatment tank 16 for continued treatment of the pre-treated water 210 flowing into the treatment tank 16. The treated water 310 is then pumped to the storage tank 18. The treated water 310 may also be subjected to subsequent filtering to remove any of the ion exchange media 30 or other particular matter remaining in the treated water 310.

During backwash cycles, the brine solution 410 is pumped into the treatment tank 16 through the collection unit 32. The brine solution 410 flows upwards through the ion exchange media 30 in the treatment tank 16 and removes any collected sulfates and NORMs that are attached to the ion exchange media 30. As the brine solution 410 fills the treatment tank 16, the backwash solution 420 containing any collected sulfates and NORMs flows out of the dispersion unit 31. The backwash solution 420 is then pumped to the backwash subsystem 400.

Figure 6:
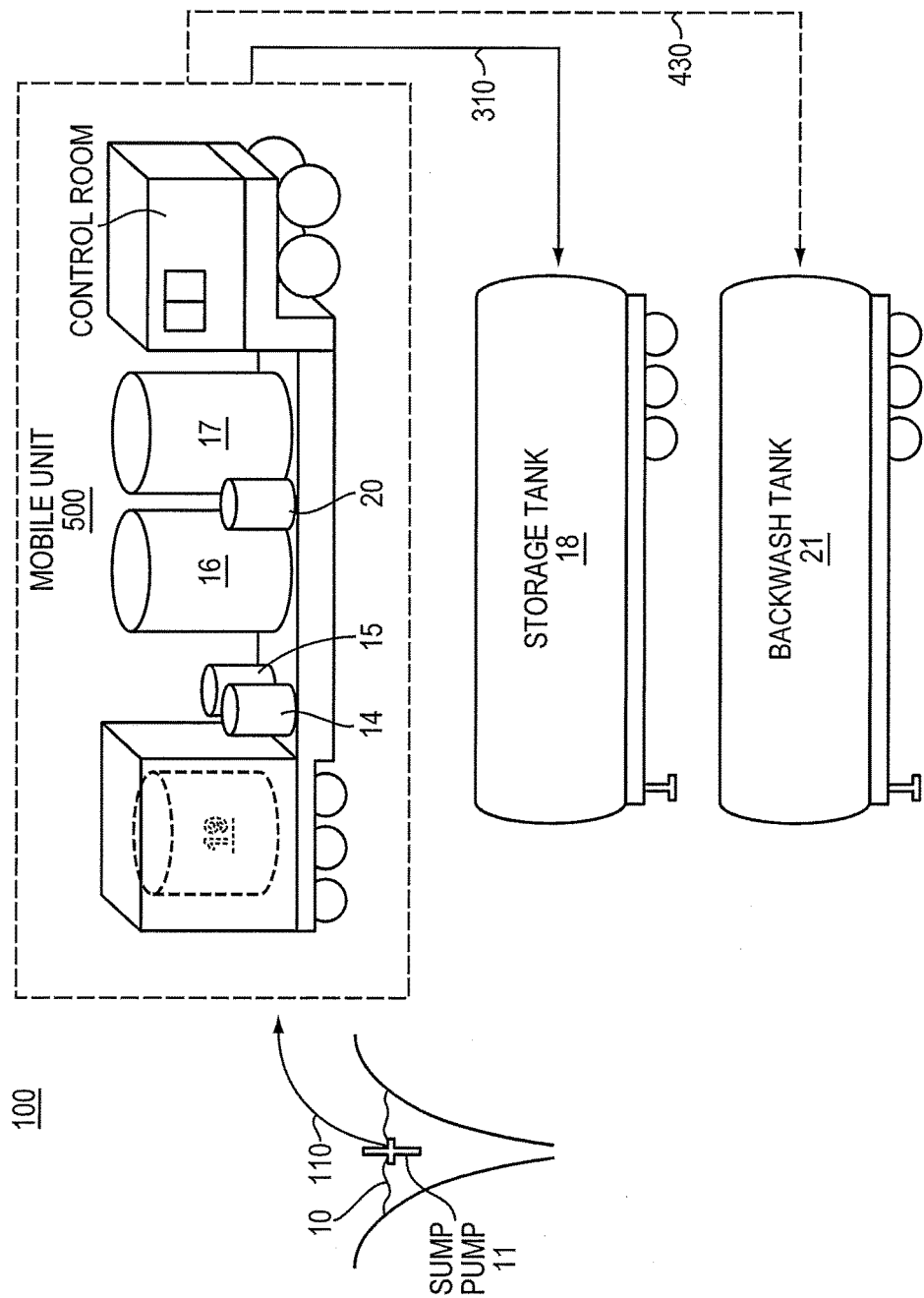
FIG. 6 is a functional diagram of the pre-treatment subsystem, the treatment subsystem and the backwash subsystem of an illustrative embodiment established at a site.

Referring now to FIG. 6, a mobile unit 500 includes the pre-treatment subsystem 200, the treatment subsystem 300 and the backwash subsystem 400 on a single, portable trailer bed. The mobile unit 500, the storage tank 18 and the backwash tank 21 are transported to the site 10 and easily interconnected via a subsystem of piping and valve units (shown in FIG. 4). A floating sump pump 11 is deployed at the site 10 and the contaminated water 110 is pumped to the mobile unit 500 where the contaminated water 110 is pre-treated by the pre-treatment subsystem 200, which includes the first filter 14 and the second filter 15. The pre-treated water 210 (shown in FIGS. 1-5(A)) is then treated by the treatment subsystem 300, which includes the first treatment tank 16 and the second treatment tank 17, each with collection units having filters with pore or inlet sizes of approximately 0.35-1.2 mm, preferably about 0.56 mm. The treated water 310 is then pumped to and collected in the storage tank 18.

After treatment of the contaminated water 110, the treatment subsystem 300 is backwashed and the solution 430 is pumped to and collected in the backwash tank 21. In other embodiments, the number of storage and backwash tanks may vary depending on the amount of treated water collected during treatment and the amount of backwash solution generated during backwashing.

In other embodiments, the number or particular use of the filter(s) of the pre-treatment subsystem may vary. For example, more than two filters may be used or the filter(s) may be completely bypassed, when, for example, the contaminated water contains low levels of particulates and debris and pre-treatment is determined to be unnecessary or impractical. The filter(s) of the pre-treatment subsystem may be made of various materials, including, but not limited to, ceramic, mesh (stainless steel, nylon, polyester, polypropylene, polyether ether ketone, or the like), paper or paper composite material, or cloth or cloth-like material. The filter(s) may also be made of resin or resin-like material, including, but not limited to, sand or filtration beads. Further, the filters may be coated with antimicrobial agents, such as fungicides, bactericides or the like.

In other embodiments, the number and particular set-up of the treatment tank(s) of the treatment subsystem 300 may vary. For example, the treatment subsystem 300 may include two or more treatment tanks and the treatment tank(s) may be of equal or different volumes. The amount of ion exchange resin in the treatment tank(s) may also vary. For example, the treatment tank(s) may be filled more than halfway with ion exchange resin or filled less than halfway with ion exchange resin. Further, if more than one treatment tank is used, the pre-treated water may alternatively be serially treated through the additional treatment tanks. For example, if two treatment tanks are used, the two treatment tanks, valves and piping subsystems may be arranged to pump pre-treated water into the first treatment tank and then pump the treated water from the first treatment tank into the second treatment tank for a second, additional treatment.

In other embodiments, the number and shape of the filter(s) of the collection unit(s) of the treatment tank(s) may vary. For example, instead of five tube-like filter extensions extending horizontally across the diameter of the treatment tank(s), these tube-like filter extensions (with pore or inlet sizes of approximately 0.35-1.2 mm) may be wider, but lesser in number (e.g. one wide tube-like filter extension), and capable of achieving the same flow rate as the five tube-like filter extensions described herein. The filters may also be made of various materials, including, but not limited to, ceramic, mesh (stainless steel, nylon, polyester, polypropylene, polyether ether ketone, or the like), PVC, paper or paper composite materials, or cloth or cloth-like materials.

As described above, and in more detail in FIG. 6, the systems fit and are contained on a single, portable trailer bed or mobile unit. This allows the systems to be easily transported to and from different sites and greatly simplifies any set-up because, among other things, a lesser number of complex, separate individual units are transported to or from a site and interconnected or disconnected at a site. Further, the particular types and configuration of the subsystems of the systems and methods, including the size of the filter pores or inlets (approximately 0.35-1.2 mm, preferably about 0.56 mm), and the ability to contain all the subsystems together on a single, portable trailer bed or mobile unit, provides, among other things, easy mobility and operability and an extremely effective removal of large quantities of sulfates and NORMs on both residential and industrial scales. This also makes the systems and methods cost effective.

Moreover, the size of the filter pores or inlets of approximately 0.35-1.2 mm, preferably about 0.56 mm, maximizes the throughput and flow rate of the systems and methods while maintaining a high removal of sulfates from the contaminated water and providing adequate room to contain the subsystems together on a single, portable trailer bed or mobile unit. The particular size of the filter pores or inlets of approximately 0.35-1.2 mm, preferably about 0.56 mm, is important in maintaining a high flow rate because the flow rate of treated water through the filter pores or inlets is the rate-limiting step of the entire system. In addition, because the size of the sulfate-specific ion exchange resin is larger than the size of the filter pores or inlets, the flow rate is primarily affected by the size of the filter pores or inlets (and the resultant flow rate of the treated water through the filter pores or inlets) rather than the size of the resin beads of the sulfate-specific ion exchange resin.

The foregoing description has been directed to specific embodiments. It will be apparent, however, that other variations and modifications may be made to the described embodiments, with the attainment of some or all of their advantages. For instance, the systems and methods described herein may be used to remove other contaminants or targeted chemicals from various contaminated water types and sources. Also, while a particular order of particular treatment processes have been shown and described, those skilled in the art will appreciate that other process orders, arrangements, orientations, etc., may be used to treat contaminated water, and that the systems and methods described herein are merely illustrative embodiments. Accordingly this description is to be taken only by way of example and not to otherwise limit the scope of the embodiments herein. Therefore, it is the object of the appended claims to cover all such variations and modifications as come within the true spirit and scope of the embodiments herein. The drawings are not drawn to scale and are not intended to limit the full scope of the embodiments herein.

What is claimed is:

1. A mobile treatment system for removing sulfates from contaminated water comprising:
   a pre-treatment subsystem including at least one pre-treatment filter configured to remove particulates and debris from the contaminated water and to produce pre-treated water;
   a treatment subsystem configured to remove sulfate ions from the pre-treated water and to produce treated water, the treatment subsystem including
   at least one treatment tank containing ion exchange media for removing the sulfate ions from the pre-treated water,
   a dispersion unit including at least one dispersion unit pipe disposed in an upper portion of the treatment tank for dispersing the pre-treated water onto the ion exchange media,
   a collection unit disposed in a bottom portion of the treatment tank to receive treated water treated by the ion exchange media, the collection unit including a base with one or more filters extending horizontally outward from one side of the base and across a diameter of a lower portion of the treatment tank, each filter having pores with sizes of 0.35-1.2 mm, wherein the treated water enters the collection unit through the pores of the filters, wherein the pre-treated water flows downwardly from the dispersion unit and through the ion exchange media to the collection unit in a treatment mode to produce the treated water, and wherein a brine solution flows upwardly from the collection unit through the ion exchange media to the dispersion unit in a backwash and regeneration mode to backwash the ion exchange media and to remove the sulfate ions from the ion exchange media;
   a backwash subsystem including a brine hydration tank configured to provide said brine solution for backwashing the ion exchange media and for removing the sulfate ions from the ion exchange media to produce a resulting brine solution;
   at least one storage tank configured to collect the treated water from the collection unit;
   first piping connected to the at least one pre-treatment filter of the pre-treatment subsystem for directing contaminated water to the at least one pre-treatment filter of the pre-treatment subsystem;
   second piping connecting the at least one pre-treatment filter of the pre-treatment subsystem to the at least one dispersion unit pipe of the dispersion unit for directing the pre-treated water from the at least one pre-treatment filter of the pre-treatment subsystem to the at least one dispersion unit pipe of the dispersion unit during the treatment mode;
   third piping connecting the base of the collection unit to the storage tank for directing the treated water from base of the collection unit to the storage tank for collecting the treated water;
   fourth piping connecting the brine hydration tank to the base of the collection unit for directing said brine solution from the brine hydration tank to the collection unit to backwash and remove the sulfate ions from the ion exchange media in the treatment tank during the backwash and regeneration mode; and
   fifth piping for receiving the resulting brine solution from the dispersion unit during the backwash and regeneration mode.

2. The system of claim 1 further comprising at least one backwash tank for receiving the resulting brine solution from the fifth piping during the backwash and regeneration mode.

3. The system of claim 1 wherein the one or more filters of the collection unit provide a flow rate of about 1900 L/min.

4. The system of claim 1 wherein the dispersion unit includes a central pipe structure extending across the top of the at least one treatment tank and pipe arms extending outwards perpendicularly from the central structure, the pipe arms having upward curving terminal ends that ensure that water flows out of each one of the pipe arms at about equal volumes, rates and pressures.

5. The system of claim 1 further comprising a heat exchanger configured to heat the pre-treated water.

6. The system of claim 1 wherein the pores are approximately 0.56 mm.

7. The system of claim 1 wherein the pre-treatment subsystem, the treatment subsystem and the backwash subsystem are contained together on a single, portable trailer bed.

8. The system of claim 1 wherein the ion exchange media is configured to remove naturally occurring radioactive materials.

9. The system of claim 1 wherein
   said brine solution contains chloride ions.

* * * * *